US008885656B2

(12) United States Patent
Wu

(10) Patent No.: US 8,885,656 B2
(45) Date of Patent: Nov. 11, 2014

(54) METHOD AND SYSTEM FOR UPDATING BLOCKED PORT INFORMATION

(75) Inventor: Shaoyong Wu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 1 day.

(21) Appl. No.: 13/496,645

(22) PCT Filed: Apr. 14, 2010

(86) PCT No.: PCT/CN2010/071779
§ 371 (c)(1),
(2), (4) Date: Mar. 16, 2012

(87) PCT Pub. No.: WO2010/145280
PCT Pub. Date: Dec. 23, 2010

(65) Prior Publication Data
US 2012/0176935 A1    Jul. 12, 2012

(30) Foreign Application Priority Data

Sep. 24, 2009   (CN) .......................... 2009 1 0093511

(51) Int. Cl.
*H04L 12/28* (2006.01)
*H04L 12/437* (2006.01)
*H04L 12/46* (2006.01)

(52) U.S. Cl.
CPC ............ *H04L 12/437* (2013.01); *H04L 12/462* (2013.01)
USPC ....................................................... 370/404

(58) Field of Classification Search
None
See application file for complete search history.

(56) References Cited

U.S. PATENT DOCUMENTS

| 6,766,482 | B1 | 7/2004 | Yip et al. | |
|---|---|---|---|---|
| 7,313,633 | B2 * | 12/2007 | Beverly | 709/245 |
| 2006/0133287 | A1 * | 6/2006 | Nishi | 370/251 |
| 2006/0245351 | A1 * | 11/2006 | Pande et al. | 370/216 |
| 2007/0258359 | A1 * | 11/2007 | Ogasawara et al. | 370/218 |
| 2008/0008181 | A1 * | 1/2008 | Yamada et al. | 370/392 |

(Continued)

FOREIGN PATENT DOCUMENTS

| CN | 101035047 A | 9/2007 |
|---|---|---|
| KR | 1020050052039 A | 6/2005 |
| KR | 1020090062082 A | 6/2009 |

OTHER PUBLICATIONS

Recommendation ITU-T G8032/Y.1344 Ethernet ring protection switching Jun. 2008.

(Continued)

*Primary Examiner* — Anh-Vu Ly
*Assistant Examiner* — Gustavo Lopez-Vargas
(74) *Attorney, Agent, or Firm* — Ling Wu; Stephen Yang; Ling and Yang Intellectual Property

(57) ABSTRACT

Disclosed in the present invention is a method for updating blocked port information. The method includes: when a node to which a ring protection link belongs in an Ethernet ring network is in a pending state and after a wait to restore timer expires, updating by the node to which the ring protection link belongs in the Ethernet ring network refreshing record information of an adjacent port of the ring protection link as: information identifying a blocked port of the node to which the ring protection link belongs in the Ethernet ring network. Also disclosed in the present invention is a system for updating blocked port information.

2 Claims, 4 Drawing Sheets

(56) References Cited

U.S. PATENT DOCUMENTS

2009/0262643 A1* 10/2009 Zhao et al. .................. 370/217
2009/0316571 A1* 12/2009 Rose ............................ 370/218
2010/0165883 A1* 7/2010 Holness et al. ............... 370/255
2012/0307823 A1* 12/2012 Yamada et al. ............... 370/389

OTHER PUBLICATIONS

International Search Report for PCT/CN2010/071779 dated Jun. 8, 2010.

* cited by examiner

METHOD AND SYSTEM FOR UPDATING BLOCKED PORT INFORMATION

TECHNICAL FIELD

The present invention relates to an updating technology in Ethernet protection, and more particularly, to a method and system for updating blocked port information in an Ethernet ring network.

BACKGROUND OF THE RELATED ART

With the development of the Ethernet towards the direction of multi-service carrying, especially some services put forward increasingly high demand on reliability and real-time of the network, the Ethernet widely takes a form of a ring network, thereby improving the reliability of the network. Also, in the ring network protection solution, generally, it is required to achieve the fast protection switching below 50 ms. At present, the technology of fast protection switching is realized based on the G.8032 protocol of International Telecommunication Union (ITU-T).

Based on the above G.8032 protocol, an automatic protection switching protocol and mechanism are defined for the Ethernet layer of the ring topology Ethernet. Such network protection method is applicable for the ring topology Ethernet, and the implementation procedure thereof roughly includes: selecting a segment of a link as a ring protection link from the ring topology Ethernet, at least one of two adjacent nodes of the ring protection link blocking a port connected to the ring protection link when there is no failure in all the links of the Ethernet ring network to prevent protected data from passing through the ring protection link, in this way, only one communication path being between any two nodes of the Ethernet ring network, thus a closed loop of a communication path not occurring in the Ethernet ring network which avoids the closed loop and network storm; and when a link of the Ethernet ring network fails, if the failed link is not the ring protection link, blocking the adjacent port of the ring protection link, and unblocking the blocked port in the ring protection link so that the protected data can pass through the ring protection link, and a new communication path is generated between any two nodes of the ring protection link, thus ensuring re-connection of the communication path and improving the reliability of the network.

During the switching process of the Ethernet ring network, the communication path of data traffic needs to be changed, and since address table information recorded by each node is not suitable after the communication path of data traffic has been changed, each node needs to update the address table, and an specific action is to delete address entries in the ports on ring. In the G.8032 protocol, when a node sends a protocol frame, the protocol frame includes its own node number and a blocked port index number, and the other nodes will extract the node number and the blocked port index number in the protocol frame after receiving the protocol frame and compare them with a node number and a blocked port index number originally stored in refreshing record information corresponding to a receiving end. If they are different, then the refreshing record information corresponding to the receiving end will be updated as the extracted node number and blocked port index number, and if the node number and the blocked port index number in the protocol frame are different from a node number and a blocked port index number of refreshing record information corresponding to an opposite end of the receiving end, then this node may further need to refresh the address table.

Although the above method for refreshing the address table of the Ethernet ring network guarantees that wrong address entries can be quickly deleted during the switching of the Ethernet, a problem of repeating refreshing during switching is further brought about. For example, in a scene that a link is switched back after being restored, the node to which the ring protection link belongs may repeat refreshing the address table, because when the node to which the ring protection link belongs is switched back, it will first block an adjacent port of the ring protection link, and then send a ring protection link blocked protocol frame to notify other nodes to be switched back, and subsequently, the node to which the ring protection link belongs will refresh the address table. However, when the node to which the ring protection link belongs then first receives the ring protection link blocked protocol frame sent by itself, as the node number and the blocked port index number of the refreshing record information of the original port are different from information included in the received protocol frame, the node to which the ring protection link belongs repeats refreshing the address table once again, which in fact is unnecessary, and will lead to broadcasting the traffic again after being stable. The problem that the node to which the ring protection link belongs repeats refreshing when the Ethernet is switched back results from the blocked port information of the node to which the ring protection link belongs in the Ethernet not being able to be updated in time. At present, there is still no scheme for the problem that the blocked port information cannot be updated in time.

SUMMARY OF THE INVENTION

In view of this, the main purpose of the present invention is to provide a method and system for updating blocked port information, so as to enable the blocked port information of a node to which a ring protection link belongs in the Ethernet to be updated in time, thus solving the problem that the node to which the ring protection link belongs repeats refreshing when the Ethernet ring network is switched back.

In order to achieve the above object, the technical solution in the present invention is implemented as follows.

A method for updating blocked port information comprises when a node to which a ring protection link belongs in an Ethernet ring network is in a pending state and after a wait to restore timer expires, the node to which the ring protection link belongs in the Ethernet ring network updating refreshing record information of an adjacent port of the ring protection link as information identifying a blocked port of the node to which the ring protection link belongs in the Ethernet ring network.

Wherein, the information identifying a blocked port of the node to which the ring protection link belongs in the Ethernet ring network specifically comprises: its own node number of the node to which the ring protection link belongs in the Ethernet ring network and an index number of the adjacent port of the ring protection link.

Wherein, the method further comprises the node to which the ring protection link belongs in the Ethernet ring network blocking the adjacent port of the ring protection link; and the node to which the ring protection link belongs in the Ethernet ring network sending a ring protection link blocked protocol frame to notify other nodes in the Ethernet ring network.

Wherein, the method further comprises the node to which the ring protection link belongs in the Ethernet ring network not executing refreshing of an address table when receiving the ring protection link blocked protocol frame sent by itself.

Wherein, not executing refreshing of an address table further comprises: the node to which the ring protection link belongs in the Ethernet ring network parsing a node number and an index number encapsulated in the ring protection link blocked protocol frame; and if the encapsulated node number and index number are the same as the node number and the index number in the updated refreshing information, the matching being successful, and the node to which the ring protection link belongs in the Ethernet ring network not executing the refreshing of the address table.

A system for updating blocked port information comprises an updating unit, configured to be used by a node to which a ring protection link belongs in an Ethernet ring network to update refreshing record information of an adjacent port of the ring protection link as information identifying a blocked port of the node to which the ring protection link belongs in the Ethernet ring network when the node to which the ring protection link belongs in the Ethernet ring network is in a pending state and after a wait to restore timer expires.

Wherein, the system further comprises a blocking unit and a sending unit; wherein, the blocking unit is configured to be used by the node to which the ring protection link belongs in the Ethernet ring network to block the adjacent port of the ring protection link; and the sending unit is configured to be used by the node to which the ring protection link belongs in the Ethernet ring network to send a ring protection link blocked protocol frame to notify other nodes in the Ethernet ring network.

Wherein, the system further comprises a refreshing execution unit, configured to be used by the node to which the ring protection link belongs in the Ethernet ring network not to execute refreshing of an address table when receiving a ring protection link blocked protocol frame sent by itself.

Wherein, the system further comprises a matching unit, configured to be used by the node to which the ring protection link belongs in the Ethernet ring network to parse a node number and an index number encapsulated in the ring protection link blocked protocol frame and compare them with the node number and the index number in the updated refreshing information; and the refreshing execution unit is further configured to be used by the node to which the ring protection link belongs in the Ethernet ring network not to execute the refreshing of the address table when the encapsulated node number and index number are the same as the node number and index number in the updated refreshing information.

In the present invention, when the node to which the ring protection link belongs in the Ethernet ring network and after a wait to restore timer expires, the node to which the ring protection link belongs in the Ethernet ring network updates the refreshing record information of the adjacent port of the ring protection link as the information identifying the blocked port of the node to which the ring protection link belongs in the Ethernet ring network.

With the present invention, as the refreshing information is pre-updated as the information identifying the blocked port of the node to which the ring protection link belongs in the Ethernet ring network, when the node to which the ring protection link belongs in the Ethernet ring network receives a ring protection link blocked protocol frame sent by itself subsequently, the ring protection link blocked protocol frame sent by the node to which the ring protection link belongs in the Ethernet ring network itself can be identified by matching the information in the ring protection link blocked protocol frame with the updated refreshing information and the refreshing of the address table will not be executed, thereby effectively avoiding repeating refreshing of the address table in the scene of switching back.

PREFERRED EMBODIMENTS OF THE PRESENT INVENTION

The basic idea of present invention is that when a node to which a ring protection link belongs in an Ethernet ring network is in a pending state and after a wait to restore timer expires, the node to which the ring protection link belongs in the Ethernet ring network updates refreshing record information of an adjacent port of the ring protection link as information identifying a blocked port of the node to which the ring protection link belongs in the Ethernet ring network.

In the following, an implementation of the technical scheme will be further described in detail in conjunction with accompanying drawings.

The advantages of the present invention relative to the related art will be better embodied by comparing the related art with the present invention.

Figure 1:
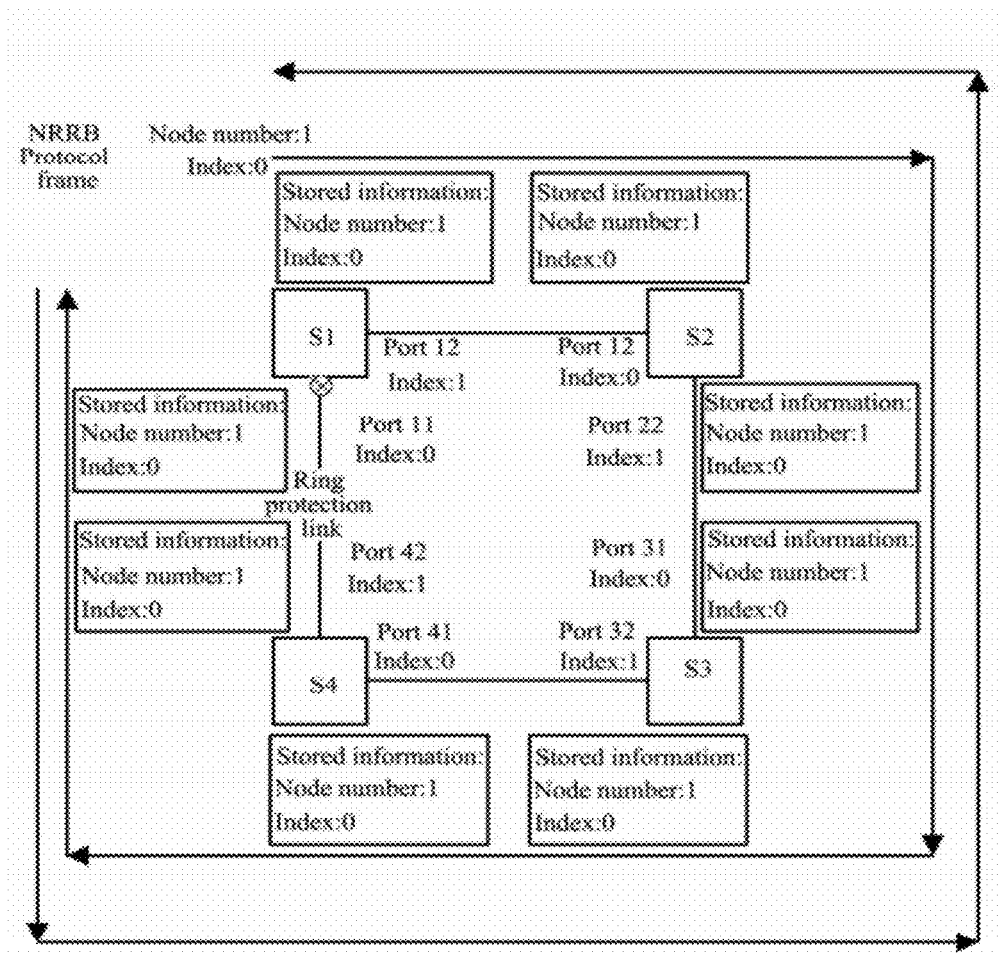
FIG. 1 is a schematic diagram illustrating running of an Ethernet ring network link without failure.

In terms of the related art, FIG. 1 is a schematic diagram of an existing Ethernet ring network protection structure based on G.8032, and as shown in FIG. 1, an Ethernet ring network is formed by nodes S1, S2, S3, and S4, the link between node S1 and S4 is a ring protection link, and node S1 is a node to which the ring protection link belongs, node S1 blocks or unblocks the ring protection link by controlling blocking or unblocking of port 11, herein port blocking means that the blocked node cannot complete the function of forwarding the protected data, but still can receive or send a protocol frame of G.8032. When there is no failure in the Ethernet ring network link shown in FIG. 1, node S1 blocks port 11 to prevent the protected data from passing through the ring protection link, i.e. it cannot be forwarded by node S1. A protected data traffic communication path between nodes S2 and S3 is only S2<->S3, rather than S2<->S1<->S4<->S3, and therefore, a closed loop of a communication path will not occur in the ring network, avoiding network storm. When there is no link failure in the Ethernet ring network, the node to which the ring protection link belongs periodically sends a ring protection link blocked protocol frame to notify other nodes that the ring protection link is in a blocked state. The ring protection link blocked protocol frame includes a node number of a sending node and an index number of the blocked port. Other nodes parse the node number and the blocked port index in the protocol frame after receiving the protocol frame, and compare them with the node number and the blocked port index number originally stored in the refreshing record information corresponding to a receiving end, and if they are different, the refreshing record information corresponding to the receiving end is updated as the extracted node number and blocked port index number. When the Ethernet ring network is stable, the refreshing record information corresponding to the port on ring of each node stores a node number of the node to which the ring protection link belongs and a blocked port index number. For example, the node number of the refreshing record information on port 41 of node S4 is 1, and the blocked port index number is 0; and the node number of the refreshing record information on port 42 is 1, and the blocked port index number is 0.

Figure 2:
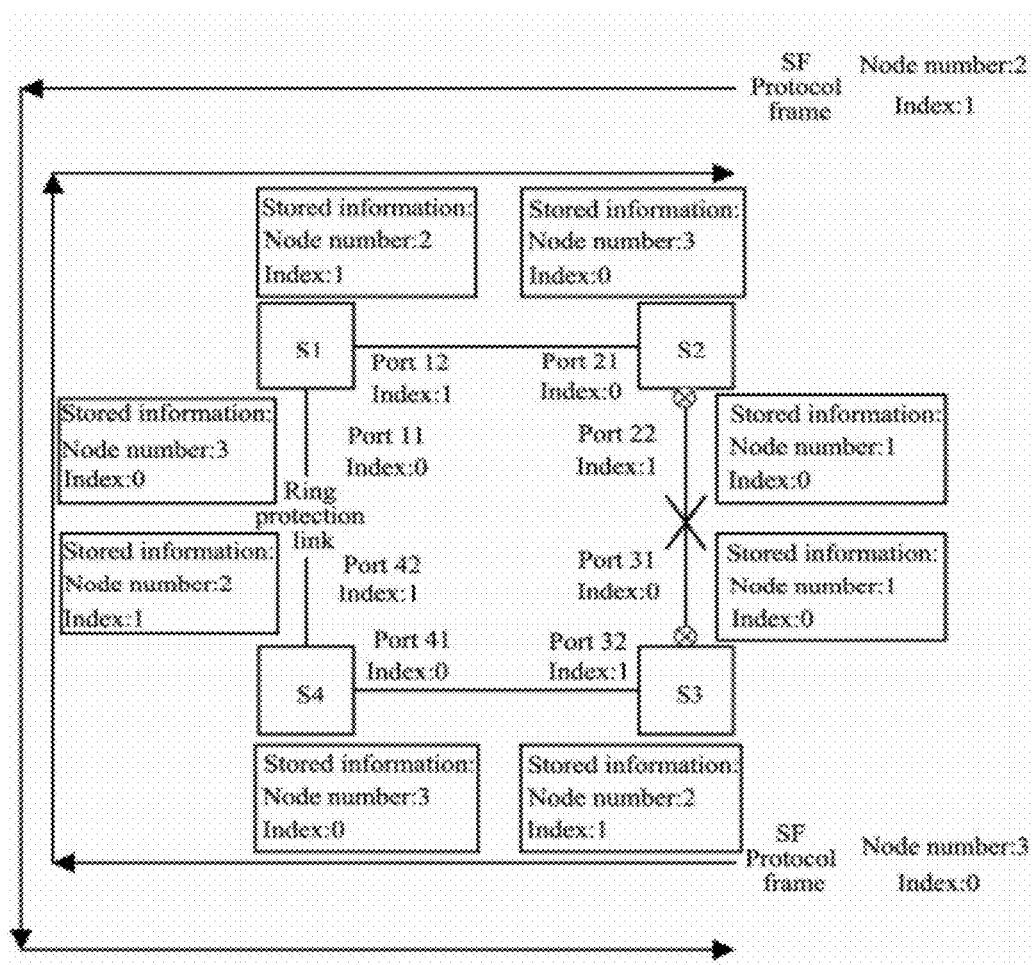
FIG. 2 is a schematic diagram illustrating running of an Ethernet ring network link with a failure.

FIG. 2 is a schematic diagram of an Ethernet ring network protection structure with a link failure in FIG. 1, and as shown in FIG. 2, assume that nodes S2 and S3 detect a link failure, then nodes S2 and S3 first block ports 22 and 31 connected to the failed link respectively, and send a link failure warning protocol frame to notify other nodes to perform protection switching; subsequently, node S1 to which the ring protection link belongs unblocks blocked port 11 connected to the ring protection link after receiving the link failure warning protocol frame which includes a node number of the sending node a blocked port index number, and other nodes extract the node number and blocked port index number in the protocol frame after receiving the protocol frame, and compare them with the node number and the blocked port index number originally stored in refreshing record information corresponding to the receiving end, and if they are different, then update the refreshing record information corresponding to the receiving end as the extracted node number and blocked port index number, and further needs to refresh an address table. For example, when node S4 first receives at port 41 a link failure warning protocol frame sent by S3 after the link is failed, the node number is 3 and the blocked port index number is 0 in the protocol frame; after comparison, node S4 discovers that they are different from the node number and the blocked port index number originally in the refreshing record information at port 41, and therefore, update the refreshing record information of port 41 as a new node number 3 and blocked port index number 0, and node S4 further needs to refresh the address table.

Although such existing scheme for refreshing an address table of the Ethernet ring network guarantees that wrong address entries can be quickly deleted during switching of the Ethernet, it gives rise to a problem of repeating refreshing during the switching. For example, the node to which the ring protection link belongs will repeat refreshing the address table when the link is switched back after being restored. When there is any failure or other protection switching request in the Ethernet ring network, a new blocked port will be generated, and if the new blocked port is not the adjacent port of the originally blocked ring protection link, then the adjacent port of the ring protection link will be unblocked. When the reason leading to the protection switching disappears, for example failure restores or other protection switching commands are cleared, if the Ethernet ring network is configured as being in a return mode, the node to which the ring protection link belongs proceeds into a pending state, and a wait to restore timer is started, and if the node to which the ring protection link belongs is in the pending state and the wait to restore timer expires, then the Ethernet ring network will perform an action of switching back. The action of switching back specifically includes: when the node to which the ring protection link belongs is in the pending state and after the wait to restore timer expires, first blocking an adjacent port of the ring protection link, then sending a ring protection link blocked protocol frame to notify other nodes to be switched back, subsequently the node to which the ring protection link belongs will refresh an address table, and other nodes will unblock the port and refresh the address table after receiving the ring protection link blocked protocol frame. When the node to which the ring protection link belongs first receives its own ring protection link blocked protocol frame, as the node number and the blocked port index number in the refreshing record information of the previous port are different from the information included in the received protocol frame, the node to which the ring protection link belongs repeats refreshing the address table once again, which in fact is unnecessary, and will lead to broadcasting traffic again after the traffic is stable. For example, in FIG. 1, during a link failure between nodes S2 and S3, for node S1, the node number of the refreshing record information stored by port 12 is 2, and the blocked port index number thereof is 1, and when the link failure between nodes S2 and S3 is restored, node S1 is switched back. When node S1 is in a pending state and after a wait to restore timer expires, it first blocks port 11, then sends a ring protection link blocked protocol frame which includes the node number being 1 and the blocked port index number being 0, subsequently node S1 needs to refresh an address table, and other nodes will unblock the blocked port and refresh the address table after receiving the ring protection link blocked protocol frame. When node S1 receives a ring protection link blocked protocol frame sent by itself, since the node number and the blocked port index number included in the protocol frame are different from the refreshing record information previously stored by the receiving end, node S1 repeats refreshing the address table once again, which in fact is unnecessary. The problem of repeating refreshing can be avoided as long as the blocked port information of the node to which the ring protection link belongs in the Ethernet is updated in time.

The present invention is provided for this end, and with the scheme for updating blocked port information according to the present invention, in a scene of switching back, when a node to which a ring protection link belongs in the Ethernet ring network is in a pending state and after a wait to restore timer expires, a node number of refreshing record information stored in an adjacent port of the ring protection link is pre-updated as its own node number, and a blocked port index number is updated as an index number of the adjacent port of the ring protection link, and thus, when the node to which the ring protection link belongs receives a ring protection link blocked protocol frame sent by itself, the node number and the blocked port index number of the refreshing record information stored by the port are the same as the protocol frame, so there is no need to repeat refreshing the address table. Thus, repeating refreshing of the address table is effectively avoided.

The scheme for updating blocked port information according to the present invention will be described in detail in the following.

A method for updating blocked port information comprises: when a node to which a ring protection link belongs in an Ethernet ring network is in a pending state and after a wait to restore timer expires, the node to which the ring protection link belongs in the Ethernet ring network updates refreshing record information of an adjacent port of the ring protection link as: information identifying a blocked port of the node to which the ring protection link belongs in the Ethernet ring network.

Here, the method further comprises: the node to which the ring protection link belongs in the Ethernet ring network will not execute refreshing of an address table when receiving a ring protection link blocked protocol frame sent by itself.

Here, other steps can be further included between the operations of updating and not executing refreshing of an address table. Then the method further comprises: the node to which the ring protection link belongs in the Ethernet ring network blocking the adjacent port of the ring protection link; the node to which the ring protection link belongs in the Ethernet ring network sending a ring protection link blocked protocol frame to notify other nodes in the Ethernet ring network, which can be notifying other nodes to be switched back. It needs to be noted here that there is not order requirements on the steps of updating, blocking and sending a protocol frame.

Here, the information identifying a blocked port of the node to which the ring protection link belongs in the Ethernet ring network specifically comprises: its own node number of the node to which the ring protection link belongs in the Ethernet ring network and an index number of the blocked adjacent port of the ring protection link. The other nodes in the Ethernet ring network refer to other nodes rather than the node to which the ring protection link belongs in the Ethernet ring network.

Here, the node to which the ring protection link belongs in the Ethernet ring network not executing refreshing of the address table when receiving a ring protection link blocked protocol frame sent by itself further comprises: the node to which the ring protection link belongs in the Ethernet ring network parsing the node number and the index number encapsulated in the ring protection link blocked protocol frame and comparing them to the node number and the index number in the updated refreshing information; if the node numbers and the index numbers are the same, then the matching is successful, and the node to which the ring protection link belongs in the Ethernet ring network will not execute the refreshing of the address table.

In summary, the present invention mainly includes the following contents:

I. If a node to which a ring protection link belongs in an Ethernet ring network is in a pending state and after a wait to restore timer expires, the node to which the ring protection link belongs in the Ethernet ring network enters a scene of switching back.

II. Under the scene of switching back, the node to which the ring protection link belongs in the Ethernet ring network blocks an adjacent port of the ring protection link; and sends a ring protection link blocked protocol frame to notify other nodes.

III. The node to which the ring protection link belongs in the Ethernet ring network updates refreshing record information of the adjacent port of the ring protection link as its own node number and an index number of the adjacent port of the ring protection link.

It needs to be noted here that there is no order requirements on the contents included in the above II and III.

Since in the present invention, the node to which the ring protection link belongs in the Ethernet ring network pre-updates the refreshing record information previously stored by the adjacent port of the ring protection link as its own block port information during switching back, after it receives a ring protection link blocked protocol frame sent by itself, as the node number and port index number included in the protocol frame are the same as the previously stored refreshing record information, the node to which the ring protection link belongs will not continue to refresh the address table, avoiding repeating refreshing, reducing traffic broadcast when the Ethernet ring network is switched back, and improving switching efficiency.

The present invention will be described by way of examples hereinafter.

Figure 3:
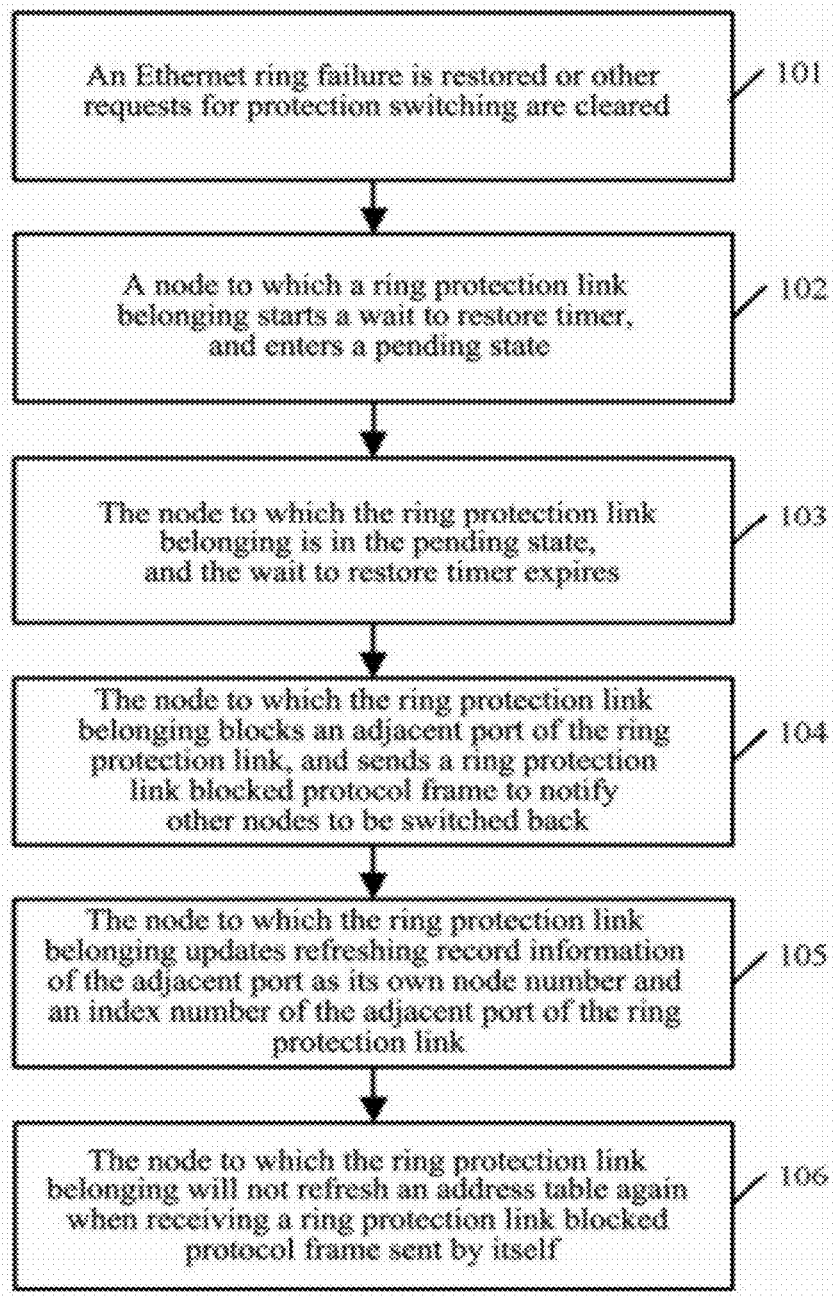
FIG. 3 is a diagram illustrating an implementation procedure of a method embodiment according to the present invention.

In an embodiment, FIG. 3 is a flowchart of a method for updating blocked port information according to the present invention in a scene of switching back, which comprises the following steps.

In step 101, a link failure in the Ethernet ring network is restored or other requests for protection switching are cleared.

In step 102, the node to which the ring protection link belongs in the Ethernet ring network starts a wait to restore timer and enters a pending state.

In step 103, the node to which the ring protection link belongs in the Ethernet ring network is in the pending state and the wait to restore timer expires.

In step 104, the node to which the ring protection link belongs in the Ethernet ring network blocks an adjacent port of the ring protection link, and sends a ring protection link blocked protocol frame to notify other nodes to be switched back, wherein, other nodes refer to other nodes except for the node to which the ring protection link belongs in the Ethernet ring network.

In step 105, the node to which the ring protection link belongs in the Ethernet ring network updates refreshing record information of the adjacent port of the ring protection link as its own node number and an index number of the adjacent port of the ring protection link.

In step 106, when the node to which the ring protection link belongs receives a ring protection link blocked protocol frame sent by itself, since the node number and the port index number included in the protocol frame are the same as the originally stored refreshing record information, the node to which the ring protection link belongs will not continue to repeat refreshing an address table.

In the following the technical scheme of the present invention will be further described in detail in conjunction with specific examples.

Figure 4:
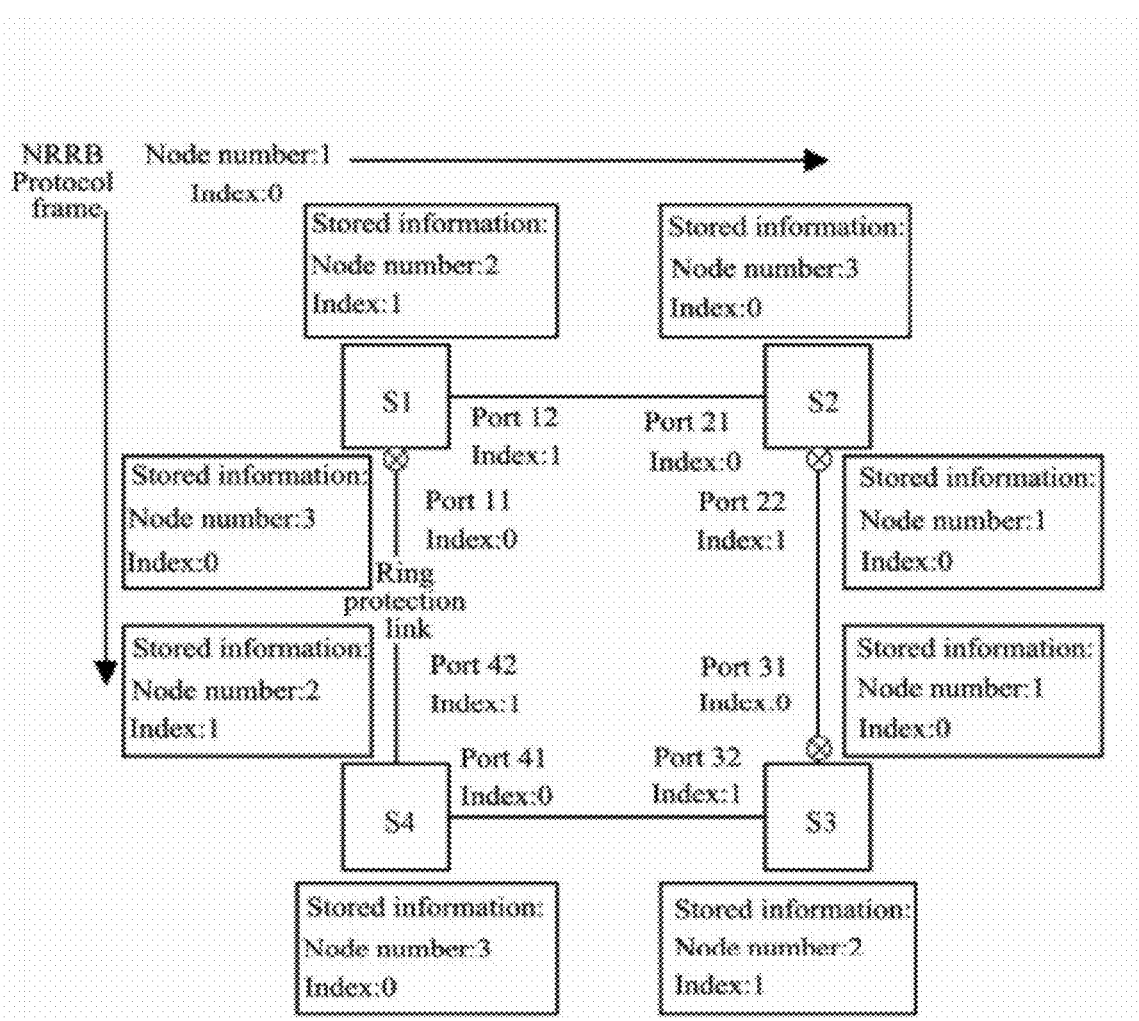
FIG. 4 is a schematic diagram illustrating running of an example according to the present invention.

In an example, FIG. 4 is an Ethernet ring network topology according to the present invention. There is a link failure between nodes S2 and S3, and after the link is restored, node S1 to which a ring protection link belongs starts a wait to restore timer and enters a pending state. When node S1 is in the pending state and after the wait to restore timer expires, switching back is carried out. First, adjacent port 11 of the ring protection link is blocked, a ring protection link blocked protocol frame which includes a node number being 1 and a blocked port index number being 0 is sent to notify other nodes to be switched back, and node S1 updates refreshing record information of port 11 as its own node number 1 and the index number 0 of port 11. When the node S1 receives a ring protection protocol frame sent by itself, with a comparison, it is found that the node number and port index number included in the protocol frame are the same as the originally stored refreshing record information, so node S1 will not repeat refreshing an address table.

A system for updating blocked port information comprises: an updating unit for use by a node to which a ring protection link belongs in an Ethernet ring network to update refreshing record information of an adjacent port of a ring protection link as information identifying a blocked port of the node to which the ring protection link belongs in the Ethernet ring network when the node to which the ring protection link belongs in the Ethernet ring network is in a pending state and after a wait to restore timer expires.

Here, the system further comprises: a blocking unit and a sending unit, wherein, the blocking unit is for use by the node to which the ring protection link belongs in the Ethernet ring network to block the adjacent port of the ring protection link, and the sending unit is for use by the node to which the ring protection link belongs in the Ethernet ring network to send a ring protection link blocked protocol frame to notify other nodes in the Ethernet ring network.

Here, the system further comprises: an refreshing execution unit for use by the node to which the ring protection link belongs in the Ethernet ring network not to execute refreshing of an address table when receiving a ring protection link blocked protocol frame sent by itself.

Here, the system further comprises: a matching unit for use by the node to which the ring protection link belongs in the Ethernet ring network to parse a node number and an index number encapsulated in the ring protection link blocked protocol frame and match them with the node number and the index number in the updated refreshing information. The refreshing execution unit is further used by the node to which the ring protection link belongs in the Ethernet ring network not to refresh the address table when the node numbers and the index numbers are the same and thus the matching is successful.

In summary, since in the present invention, the node to which the ring protection link belongs in the Ethernet ring network actively updates the refreshing information of a port, avoiding repeating refreshing during switching back, with the present invention, not only the problem of repeating refreshing under a scene of switching back can be avoided, but also the switching efficiency of the Ethernet ring network can be improved.

Here, the above ring protection link blocked protocol frame can be indicated by NRRB frame; the link failure warning protocol frame can be indicated by SF frame; the return mode can be indicated by Revertive mode; the pending state can be indicated by Pending state; the wait to restore timer can be indicated by WTR, and the full name thereof is Wait to Restore; the manual switch protection switching request can be indicated by MS, and the full name thereof is Manual Switch; and the forced switch protection switching request can be indicated by FS, and the full name thereof is Forced Switch.

The above description is merely preferred embodiments of the present invention, and is not intended to limit the protection scope of the present invention.

I claim:

1. A method for updating blocked port information, comprising:

when a node belonging to a ring protection link belongs in an Ethernet ring network is in a pending state and after a wait to restore timer expires:

said node updating refreshing record information of an adjacent port of the ring protection link as its own node number of said node and an index number of the adjacent port before blocking the adjacent port and sending a ring protection link blocked protocol frame to notify other nodes in the Ethernet ring network;

after said node receives a ring protection link blocked protocol frame sent by itself, said node will not refresh its address table;

wherein the operation of not executing refreshing of an address table further comprises: said node parsing a node number and an index number encapsulated in the ring protection link blocked protocol frame; and if the encapsulated node number and index number are the same as the node number and the index number in the updated refreshing information, a matching being successful, and said node not executing the refreshing of the address table.

2. A system for updating blocked port information, comprising at least a node belonging to a ring protection link in an Ethernet ring network, wherein said node comprises a processor, the processor comprising:

an updating unit, configured to update refreshing record information of an adjacent port of the ring protection link as its own node number of said node and an index number of the adjacent port;

a blocking unit, configured to block the adjacent port; and a sending unit, configured to send a ring protection link blocked protocol frame to notify other nodes in the Ethernet ring network; wherein when said node is in a pending state and after a wait to restore timer expires:

the updating unit updates refreshing record information of the adjacent port as its own node number of said node and the index number of the adjacent port before the blocking unit blocks the adjacent port and the sending unit sends a ring protection link blocked protocol frame to notify other nodes in the Ethernet ring network after said node receives a ring protection link blocked protocol frame sent by itself, said node will not refresh its address table;

wherein the processor further comprising a matching unit, configured to parse a node number and an index number encapsulated in the ring protection link blocked protocol frame and compare them with the node number and the index number in the updated refreshing information; and the refreshing execution unit is further configured not to execute the refreshing of the address table when the encapsulated node number and index number are the same as the node number and the index number in the updated refreshing information.

* * * * *